US006682680B2

(12) United States Patent
Peterman

(10) Patent No.: US 6,682,680 B2
(45) Date of Patent: Jan. 27, 2004

(54) METHOD OF APPLYING AN EDGE SEALING STRIP TO A WOOD PRODUCT PIECE

(75) Inventor: Robert J. Peterman, Eugene, OR (US)

(73) Assignee: Joined Products, Inc., Eugene, OR (US)

( * ) Notice: Subject to any disclaimer, the term of this patent is extended or adjusted under 35 U.S.C. 154(b) by 159 days.

(21) Appl. No.: 10/052,851

(22) Filed: Nov. 10, 2001

(65) Prior Publication Data

US 2003/0089449 A1 May 15, 2003

(51) Int. Cl.[7] .................................... B29C 59/04

(52) U.S. Cl. ....................... 264/259; 425/113; 425/115; 425/119; 425/126.1; 156/583.1; 156/583.5; 156/583.6

(58) Field of Search ................................ 118/106, 257, 118/304, 58, 641; 156/580, 583.1, 583.5, 583.6, 578; 264/259; 425/113, 115, 117, 119, 126.1

(56) References Cited

U.S. PATENT DOCUMENTS

| | | | | |
|---|---|---|---|---|
| 3,956,555 | A | 5/1976 | McKean | 428/106 |
| 3,989,228 | A | 11/1976 | Morris et al. | 259/4 AC |
| 4,199,632 | A | 4/1980 | Travis | 428/54 |
| 4,316,673 | A | 2/1982 | Speer | 366/337 |
| 4,952,068 | A | 8/1990 | Flint | 366/337 |
| 5,026,593 | A | 6/1991 | O'Brien | 428/215 |
| 5,135,793 | A | 8/1992 | Socha | 428/74 |
| 5,234,747 | A | 8/1993 | Walser et al. | 428/215 |
| 5,350,233 | A | 9/1994 | Sonntag et al. | 366/160 |
| 5,652,065 | A | 7/1997 | Park et al. | 428/537.1 |
| 5,843,580 | A | 12/1998 | van der Heide et al. | 428/511 |
| 5,935,368 | A | 8/1999 | Tingley | 156/267 |
| 5,944,928 | A | 8/1999 | Seidner | 156/160 |
| 6,001,452 | A | 12/1999 | Bassett et al. | 428/105 |
| 6,033,754 | A | 3/2000 | Cooke | 428/106 |
| 6,051,301 | A | 4/2000 | Tingley | 428/106 |
| 6,066,222 | A | 5/2000 | Fulford | 156/154 |
| 6,217,976 | B1 | 4/2001 | Macpherson et al. | 428/106 |
| 6,231,327 | B1 * | 5/2001 | Shanahan et al. | 425/113 |
| 2002/0030301 | A1 * | 3/2002 | Honig | 264/171.13 |

* cited by examiner

*Primary Examiner*—Laura Edwards
(74) *Attorney, Agent, or Firm*—Law Office of Timothy E. Siegel; Timothy E. Siegel

(57) ABSTRACT

A method of applying a protective strip to an edge of a wood product piece. The process uses a set of aligned rollers and a belt apparatus that includes a pair of rollers having a shoe positioned between them and a belt fitted about the rollers and the shoe. The distance from the belt to the first set of aligned rollers is substantially equal to the width of the wood product piece. The wood product piece is placed between the first set of aligned rollers and the belt apparatus and resin is applied to the edge the wood product piece. The wood products piece is then squeezed between the first set of aligned rollers and the belt apparatus. At least a subset of the rollers are driven to move the wood products piece along the belt apparatus, thereby causing the resin to be squeezed into the edge of the wood products piece. Finally, the resin is cured.

11 Claims, 3 Drawing Sheets

METHOD OF APPLYING AN EDGE SEALING STRIP TO A WOOD PRODUCT PIECE

BACKGROUND OF THE INVENTION

The use of wood products as exterior surface elements has caused occasional serious problems. Among these is the case of a major wood products manufacturer whose siding product was inadequately tested and, in practice, suffered from degradation due to fungal growth in the interstices of the wood fiber. The resultant replacement expense has exceeded one billion dollars.

As at least a partial result of this fiasco, builders and home purchasers alike have come to view wood composites and even laminates with a strong suspicion. As a result, the introduction of beneficial new products has been rendered far more difficult.

In addition to the problem of public perception, there is the actual physical problem of preventing degradation of exterior wood products due to the attack of the elements over a lengthy period of time. The full range of moisture, temperature variation and biological attack that will be mounted against an exterior piece may be difficult to fully predict and model in pre-distribution testing. Accordingly, it is desirable to guard as fully as possible against any prospective avenue of attack by the elements. One such avenue is the seam or seams of a laminated wood piece. For example, water droplets may gather on the bottom edge of a laminated siding piece and present a real or a perceptual danger of delamination. Adding to this problem is the fact that any sealant strip applied to prevent access by water to the seam must itself be adhered in such a manner as to resist attack by the elements over a lengthy period of time.

SUMMARY OF THE INVENTION

In a first separate aspect, the present invention is a method of applying a protective strip to an edge of a wood product piece. The process uses a set of aligned rollers and a belt apparatus that includes a pair of rollers having a shoe positioned between them and a belt fitted about the rollers and the shoe. The distance from the belt to the first set of aligned rollers is substantially equal to the width of the wood product piece. The wood product piece is placed between the first set of aligned rollers and the belt apparatus and resin is applied to the edge the wood product piece. The wood products piece is then squeezed between the first set of aligned rollers and the belt apparatus. At least a subset of the rollers are driven to move the wood products piece along the belt apparatus, thereby causing the resin to be squeezed into the edge of the wood products piece. Finally, the resin is cured.

In a second separate aspect, the present invention is a device adapted to apply a protective strip to an edge of a wood product piece. The device includes a set of aligned rollers and a belt apparatus, substantially parallel to the set of aligned rollers, and which in turn includes a pair of rollers having a shoe between them and a belt, mounted on the rollers about the shoe. The belt apparatus is spaced apart from the set of aligned rollers by substantially the width of the wood product piece. The device also includes a resin applying assembly adapted to apply resin to the edge and a resin curing assembly adapted to cure the resin after it has been applied to the edge.

DETAILED DESCRIPTION OF THE PREFERRED EMBODIMENT

Figure 1:
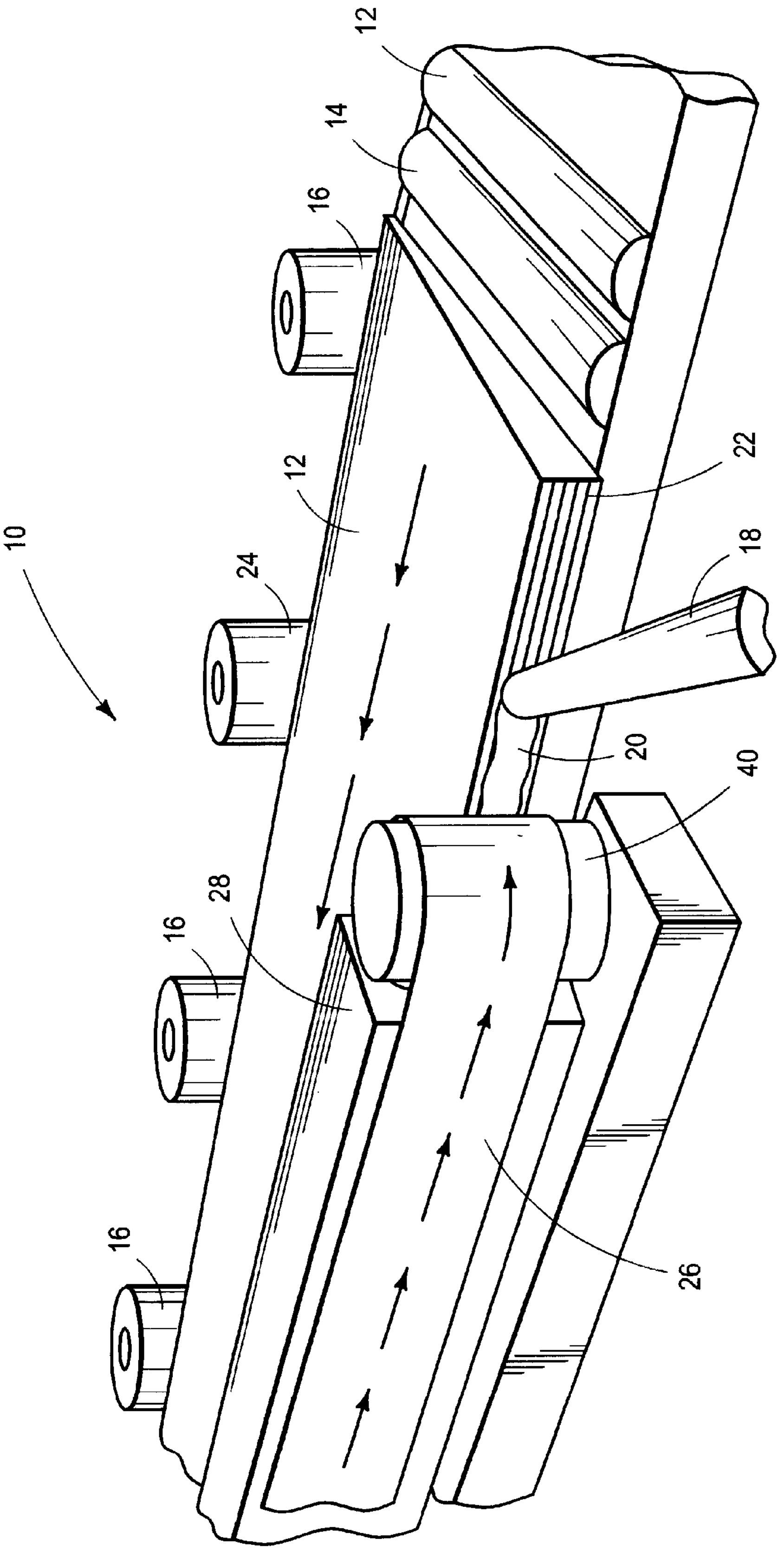
FIG. 1 is a perspective view of an edge sealing device, according to the present invention, showing a wood product piece being processed.
Figure 2:
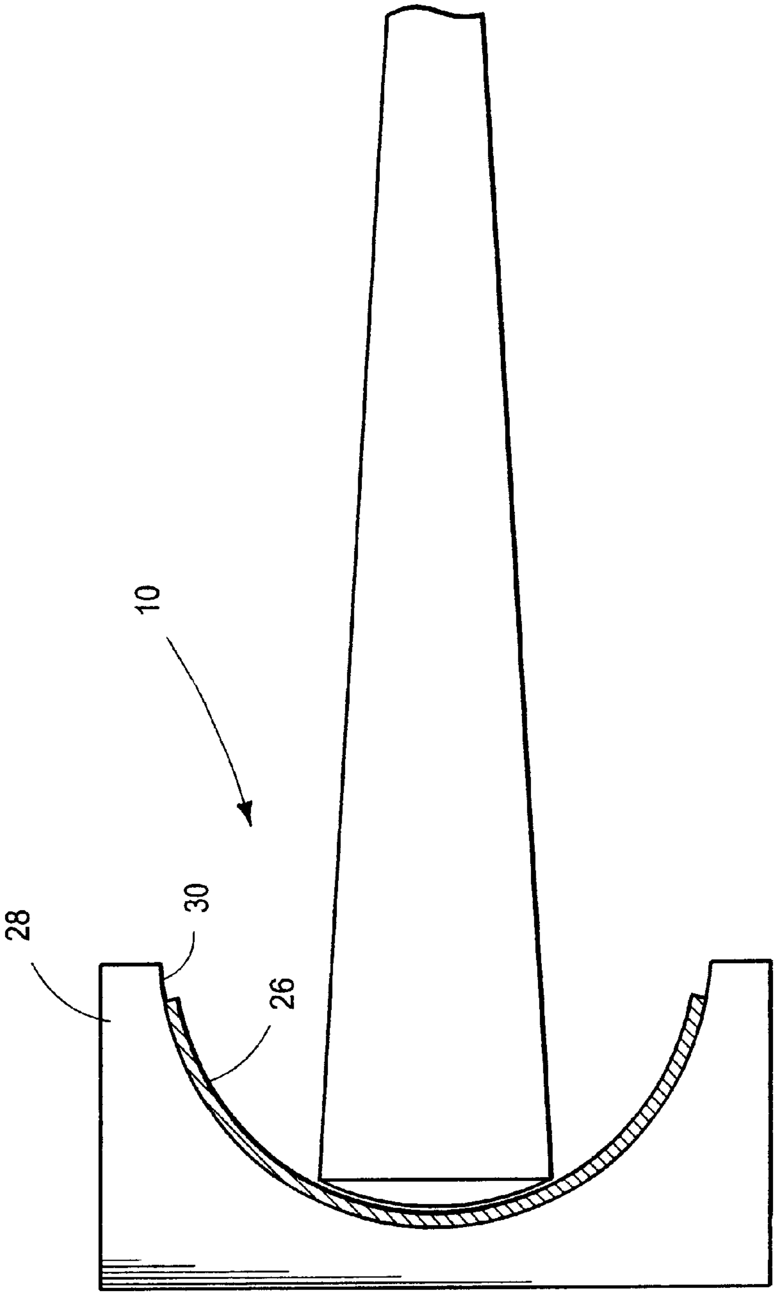
FIG. 2 is a cross-sectional view of the device of claim 1, showing a wood product piece being processed.
Figure 3:
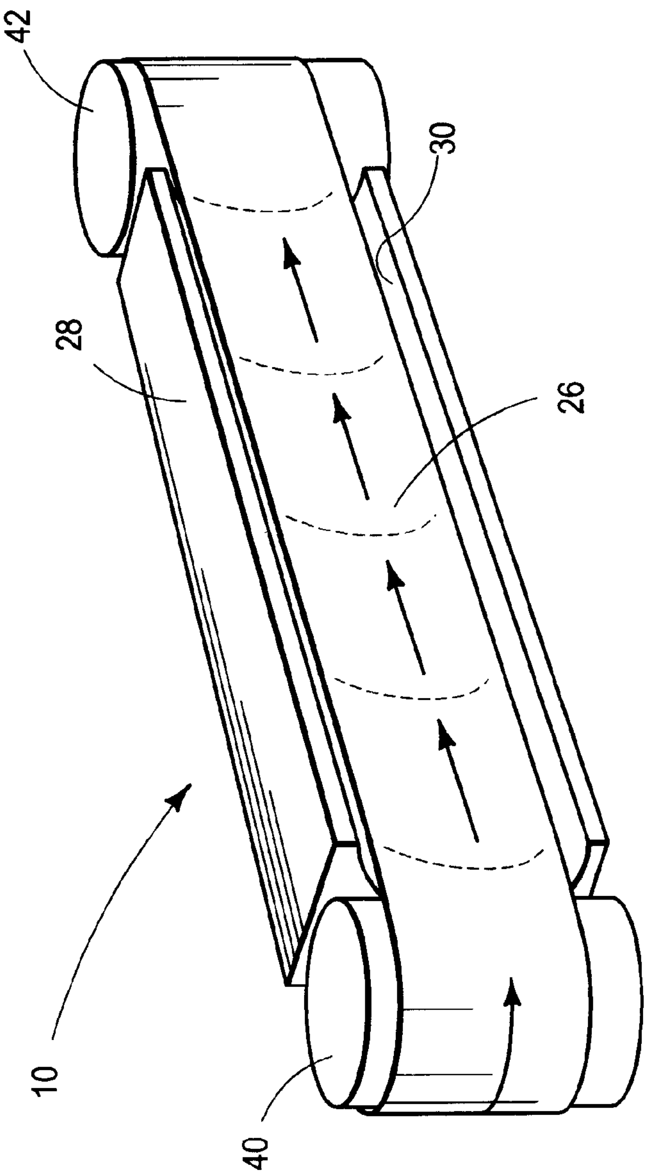
FIG. 3 is a perspective view of the device of claim 1, showing the concave portion of the shoe and belt.

Referring to FIGS. 1–3, in a preferred embodiment, the present invention is an edge-sealing device 10 adapted to place a sealing strip on the edge of a wood product piece 12, such as a wood laminate. The wood product piece is moved along a roll-case conveyer 14 as it contacts the first of a set of guide rollers 16. A mixing tube 18 mixes and applies a two-part polyurethane resin 20 to a resin receiving edge 22 of product piece 12. A pressure guide roller 24 presses wood product piece 12 into a belt 26 that is laterally supported by a shoe 28 having a concave surface 30. Belt 26 is supported and driven by a first roller 40 and a second roller 42. Shoe 28 is heated to between 55° C. (120° F.) to 61.25° C. (130° F.), and is configured so that heat is radiated outwardly toward the wood product piece 12 at the point in its path where it passes pressure guide roller 24. This temperature is regulated by a set of thermocouples (not shown) inside the shoe 28. The belt 26 is set to move the product piece 12 at between 0.305 m/s (60 ft/min) and 0.406 m/s (80 ft/min).

There are several advantages to this particular preferred embodiment. The concave surface of the shoe 28 maintains the resin 20 in contact with the resin receiving edge 22 of product piece 12. A flat shoe would cause the resin 20 to be squeezed out along the sides of edge 22. Moreover, the pressure applied by roller 24, shoe 28 and belt 26 causes the resin 20 to be pressed into the interstices of the wood grain, wood fiber and/or laminate seam to form a robust bond. Furthermore, the shape of shoe 28 imparts a pleasing rounded quality to the edge strip of cured resin 20 of the finished wood product piece 12. Finally, the heat curing of the resin 20 permits a strong bond to be formed during the relatively short period of time that the product piece 12 is in the device 10.

The two-part polyurethane product 20 is preferably a product available under the name U-100-B Synthetic Patch/ Pails and product code 100921110 from Willamette Valley Company of Eugene, Oreg. This product takes the form of two liquid parts that are mixed together in the mixing tube 18 immediately prior to application. After mixing, a heat of between 55° C. (120° F.) and 61.25° C. (130° F.) is sufficient to cure the product. Belt 26 is available from MFG Belt Service Corporation of Eugene, Oreg., under the designation 3 Ply Poly 60 White Teflon®, Working Tension 90 lbs, Temp Range 0(0)/250(0). This belt 26 is coated with poly tetrafluoroethylene (more commonly known as Teflon®), which provides a nonstick surface, permits easy separation of the cured product 20, as product piece 12 leaves the belt 16. In addition, as product piece 12 arrives at its point of departure from belt 16, cured product 20 has cooled somewhat, permitting an easier separation from belt 16.

The terms and expressions which have been employed in the foregoing specification are used as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A method of applying a protective strip to an edge of a wood product piece, said method comprising:

(a) providing a set of aligned rollers;

(b) providing a belt apparatus, including:

(i) a first belt apparatus roller;

(ii) a second belt apparatus roller;

(iii) a shoe positioned in between said first belt apparatus roller and said second belt apparatus roller; and (iv) a belt fitted about said first belt apparatus roller, said second belt apparatus roller and said shoe and wherein said belt apparatus is substantially parallel to said first set of aligned rollers, and wherein said distance from said belt to said first set of aligned rollers is substantially equal to the width of said wood product piece;

(c) placing said wood product piece between said first set of aligned rollers and said belt apparatus;

(d) applying resin to said edge;

(e) squeezing said wood products-piece between said first set of aligned rollers and said belt apparatus and driving at least a subset of said rollers to move said wood products piece from said first belt apparatus roller to said second belt apparatus roller, thereby causing said resin to be squeezed into said edge of said wood products piece to form said protective strip; and (f) curing said resin.

2. The method of claim 1 wherein said resin is made of two separate portions that are mixed together immediately prior to step (d).

3. The method of claim 1 wherein said resin is heat cured.

4. The method of claim 3 wherein said shoe is heated to cure said resin.

5. The method of claim 1 wherein said shoe is concave to contain said resin as it is being pressed into said edge.

6. The method of claim 1 wherein said belt is coated with a non-stick substance on the side that contacts said product piece.

7. A device adapted to apply a protective strip to an edge of a wood product piece, said device comprising:

a) a set of aligned rollers;

(b) a belt apparatus, including:

(i) a first belt apparatus roller;

(ii) a second belt apparatus roller;

(iii) a shoe positioned in between said first belt apparatus roller and said second belt apparatus roller; and (iv) a belt fitted about said first belt apparatus roller, said second belt apparatus roller and said shoe and wherein said belt apparatus is substantially parallel to said first set of aligned rollers, and wherein said distance from said belt to said first set of aligned rollers is substantially equal to the width of said wood product piece;

(c) a resin applying assembly adapted to apply resin to said edge to form said protective strip; and (d) a resin curing assembly adapted to cure said resin after it has been applied to said edge.

8. The device of claim 7 wherein said resin applying assembly is adapted to mix together two separate portions of resin immediately prior to step (d).

9. The device of claim 7 wherein said resin curing assembly includes a heat producing apparatus adapted to heat cure said resin.

10. The device of claim 9 wherein heat producing apparatus heats said shoe.

11. The device of claim 7 wherein said shoe is concave to contain said resin as it is being pressed into said edge.

* * * * *